United States Patent
Saxena

(10) Patent No.: US 9,021,312 B1
(45) Date of Patent: Apr. 28, 2015

(54) METHOD AND APPARATUS FOR VISUAL PATTERN ANALYSIS TO SOLVE PRODUCT CRASHES

(71) Applicant: Intuit Inc., Mountain View, CA (US)

(72) Inventor: Saurabh Saxena, Bangaloe (IN)

(73) Assignee: Intuit Inc., Mountain View, CA (US)

( * ) Notice: Subject to any disclaimer, the term of this patent is extended or adjusted under 35 U.S.C. 154(b) by 184 days.

(21) Appl. No.: 13/747,230

(22) Filed: Jan. 22, 2013

(51) Int. Cl.
*G06F 11/00* (2006.01)
*G06F 11/07* (2006.01)

(52) U.S. Cl.
CPC .......... *G06F 11/0778* (2013.01); *G06F 11/079* (2013.01); *G06F 11/0775* (2013.01)

(58) Field of Classification Search
None
See application file for complete search history.

(56) References Cited

U.S. PATENT DOCUMENTS

| | | | |
|---|---|---|---|
| 6,266,788 B1 * | 7/2001 | Othmer et al. | 714/38.11 |
| 8,209,567 B2 * | 6/2012 | Cohen et al. | 714/45 |
| 8,726,092 B1 * | 5/2014 | Gray et al. | 714/38.1 |
| 2005/0289404 A1 * | 12/2005 | Maguire | 714/57 |
| 2006/0156077 A1 * | 7/2006 | Altaf et al. | 714/57 |
| 2008/0183668 A1 * | 7/2008 | Bhamidipaty et al. | 707/2 |
| 2009/0006883 A1 * | 1/2009 | Zhang et al. | 714/1 |
| 2010/0191731 A1 * | 7/2010 | Rus et al. | 707/737 |
| 2010/0306600 A1 * | 12/2010 | Shinboku | 714/48 |

OTHER PUBLICATIONS

Podgurski et al., "Automated Support for Classifying Software Failure Reports", 2003, IEEE.*

* cited by examiner

*Primary Examiner* — Gabriel Chu
(74) *Attorney, Agent, or Firm* — Park, Vaughan, Fleming & Dowler LLP

(57) ABSTRACT

Some embodiments described herein provide a system to facilitate determining a solution for a software product crash. During operation, a server can receive multiple crash reports, wherein each crash report corresponds to a crash instance of the software product. The crash reports can be received from client systems where the product was executing before the crash. The server can then generate a description for each crash instance based on the corresponding crash report. Next, the server can create a crash report page that visually organizes each of the crash descriptions. Finally, the crash report can be displayed to a user to facilitate determining a solution to at least some of the crash instances.

17 Claims, 5 Drawing Sheets

| CRASH CODE NUM 410 | DATE 412 | SKU 414 | CUSTOMER INPUT 416 | EMAIL ADDRESS 418 | OS 420 | DATE DRIVE TYPE 422 | AUDIT TRAIL 424 |
|---|---|---|---|---|---|---|---|
| 3113120 | 5/22/10 | PRO | UPDATING COMPANY FILE | lf@tr.com | WinXP | NETWORK DRIVE | YES |
| 3113088 | 5/21/10 | PREMIER | SIGN IN | fl@sn.com | Win Server 2003 | HARD | NO |
| | | | ..... | | | | |

CRASH REPORT PAGE
400

FIG. 4

| RANK NUM 510 | CRASH CODE NUM 512 | TOTAL % 514 | CUM % 516 | ROOT CAUSE 518 |
|---|---|---|---|---|
| 1 | 1524719 | 12.1% | | INVOICE FORM PRINT |
| 2 | 1344532 | 10.1% | 22.2% | PDF CRASH |
| ... | ... | ... | ... | ... |

DISPLAY OF
CRASH CODE NUMBERS RESOLVED
BY PATCH TOPAZ-R3
500

FIG. 5

METHOD AND APPARATUS FOR VISUAL PATTERN ANALYSIS TO SOLVE PRODUCT CRASHES

FIELD

The present disclosure generally relates to facilitating determining solutions for software product crashes. More specifically, the present disclosure relates to organizing and displaying information associated with crash instances of a software product.

SUMMARY

Some embodiments described herein provide techniques and systems to facilitate determining a solution for a software product crash. During operation, a server receives crash reports. Each crash report corresponds to a crash instance of the software product at a client. The server then generates a description for each crash instance based on the crash reports. Next, the server creates a crash report page that visually organizes each of the descriptions. Finally, the crash report page is displayed to the user (e.g., a software engineer), thus facilitating the user to determine a solution to at least some of the crash instances of the software product.

In some embodiments described herein, each crash report contains one or more of a memory dump, a log file, and a crash code number.

In some embodiments described herein, each crash report also contains information associated with one or more of: a product version number, an operating system, a service pack in effect, previously installed product patches, product configuration information, and a stock-keeping unit (SKU) code associated with the software product.

In some embodiments described herein, the crash code number is based on at least one of: a filename, a function name, and a source code line number that was executing when the crash instance that corresponds to the crash report occurred.

In some embodiments described herein, each crash report also contains customer input regarding the crash instance. Specifically, the customer input may contain work flow information (e.g., the feature of the software product that the customer was using or the task that the customer was performing when the crash occurred) and/or a customer email address.

In some embodiments described herein, generating a description of a crash instance involves assembling data corresponding to the crash instance. The assembled data includes one or more of the following pieces of information: crash code number, date of the crash, SKU code, operating system, user mode in effect, number of users logged in, name of function under execution, source code line number under execution, source filename under execution, mode of operation, data file drive type, audit trail, and a portion of a memory dump.

In some embodiments described herein, generating the description of a crash instance further involves assembling data corresponding to the customer input.

Additionally, in some embodiments described herein, a system (e.g., the server) receives a product patch identifier along with a set of crash code numbers corresponding to crash instances that are resolved when a product patch corresponding to the product patch identifier is applied to the software product. The system stores an association between the set of crash code numbers and the product patch identifier in a database.

In some embodiments described herein, the system ranks the received set of crash codes based on a frequency of reported crash occurrences of the corresponding crash instances, and displays a ranked list of crash code numbers associated with a product patch identifier to the developer at the server system.

In some embodiments described herein, displaying the ranked list of crash codes includes displaying a ranking for the crash code number, a root cause associated with the crash code number, and a percentage value of occurrence of a crash instance corresponding to the crash code number based on the total reported number of crashes.

In some embodiments described herein, the system sends an email regarding a product patch corresponding to the product patch identifier to available email addresses associated with each crash code number in the set of crash code numbers associated with the product patch identifier.

In some embodiments described herein, the system receives a new crash report of the software product from a customer at a client system, determines the crash code number from the new crash report, determines that a product patch identifier is associated with the crash code number, and sends an email to the customer's email address regarding the product patch corresponding to the product patch identifier.

In some embodiments described herein, the system receives a new crash report of the software product from a customer, where the new crash report has information regarding a previously installed product patch that was applied to the software product, wherein the product patch corresponds to a product patch identifier. The system then determines the crash code number from the new crash report. Next, if the system determines that the new crash code number is associated with the product patch identifier in the database (which implies that the product patch should have fixed the crash instance corresponding to the crash code), then the system removes the association between the crash code number and the product patch identifier (because the problem that was supposed to have been fixed by the product patch was apparently not fixed), and notifies the developer that the previously generated product patch is insufficient.

BRIEF DESCRIPTION OF THE FIGURES

FIG. 4 presents a display of multiple crash reports generated for viewing by a developer at a server system in accordance with some embodiments described herein.

FIG. 5 presents a display of a ranked list of top crashes associated with a product patch generated by some embodiments described herein.

DETAILED DESCRIPTION

Figure 1:
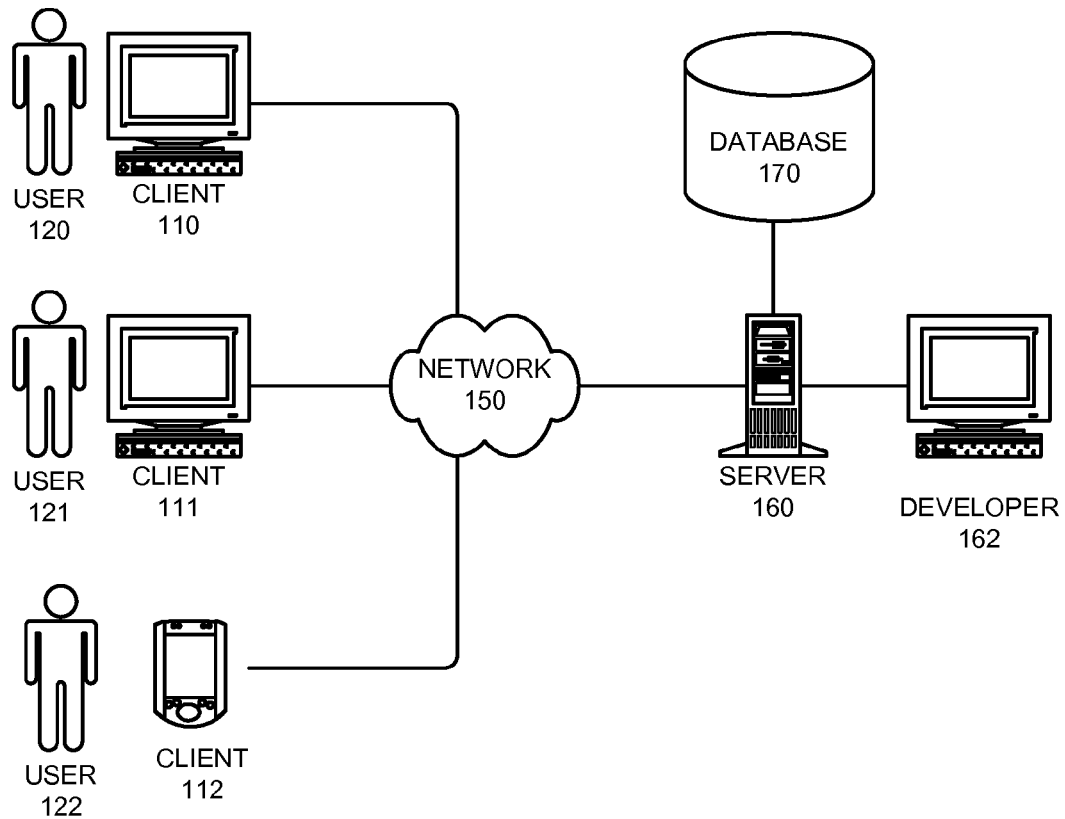
FIG. 1 illustrates a computing environment in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating signal.

The methods and processes described in the detailed description section can be embodied as code and/or data, which can be stored in a non-transitory computer-readable storage medium as described above. When a computer system reads and executes the code and/or data stored on the computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Typically, a software product is developed and tested extensively before being released into the market. However, often there are bugs in the product that may surface due to unique features in an environment within which the product is installed or used, configuration options that are chosen at the client system by the end-user, or certain work-flow decisions that violate assumptions in the code. These bugs will cause the product to crash in spite of extensive pre-release product testing.

A product crash can be analyzed by generating a crash report at the client computer where the product was running before it crashed. The generated crash report contains information related to the product crash. Often, this crash report is sent for analysis and debugging purposes to a developer who is located at a server system.

For example, within the Intuit QuickBooks™ Desktop product, a crash report generated for a typical crash may contain information such as a product log file, crash date, a crash dump that is usually in the form of a memory dump, information on the client system hardware and software configurations, and files with information on the software product version, release version, etc.

Determining a solution for a reported crash involves collecting the generated crash report, and providing the crash report to a software developer for analysis and debugging. In turn, the developer uses the crash report to make educated guesses about events occurring at the client system prior to and during the product crash. This might, for example, involve making assumptions about events at the client system based on the crash dump, using the Call Stack functionality within Microsoft Visual Studio™. The crash dump can provide information on function calls and other code details that were in effect immediately before as well as when the crash occurred. However, this is not always the case, since often during a crash the call stack may get corrupted and may not offer meaningful information to the developer for resolving the causes behind the crash. Furthermore, an individual crash report may not provide a full picture of the crash that is needed to replicate the crash at the developer's end for successful debugging.

Organizing Multiple Crash Reports

Some embodiments described herein facilitate the process of organizing information (e.g., visually organizing information on a screen) obtained from crash reports to help a developer to determine a solution for the crashes (when the information from multiple crash reports is visually organized, the developer will be able to visually detect patterns in the crash report data, thereby enabling the developer to determine a solution to the problem that caused the crash). Each crash instance of the software product generates an individual crash report that is sent to a server system. Some embodiments described herein assemble varied individual crash reports received at the server system and organize them into a unified display format. These reports are generated by crash instances occurring at multiple client computers running the software product. Such a unified display of the assembled crash reports provides a view of an individual crash report juxtaposed alongside other crash reports. As a consequence, the developer is able to observe commonalities that occur across multiple crash instances in the course of using the software product across a variety of computing environments and configurations, and during the course of a variety of work-flow tasks being performed by the client. This, in turn, enables the developer to replicate the customer environment more precisely during a product crash, thereby leading to speedy solutions.

In some embodiments described herein, the system receives crash reports of the software product as they occur in the field at varied client computers. Each crash report corresponds to a specific crash instance of the product occurring at a same or different client system. The client system generates a description of the crash instance in the crash report, and sends this to the server system. This description of a crash instance is added to a crash report page that can be displayed to the developer. The crash report page is, therefore, an evolving documentation, in a unified manner, of multiple crashes of the product installations in the field.

The crash report page can be updated at predetermined default time intervals as new crash reports are received. In some embodiments described herein, the update period is configurable, and may involve frequent crash report page updates when a new product is released (for example, twice daily), and may be updated over longer periods (for example, weekly) as the product has been in the field over a long period of time. This reflects typical product crash behavior in the field when product crashes become infrequent as more patches are determined and installed in response to initial product crashes.

Each crash report (which is generated as a result of a product crash at the client system) may contain a log file, a memory core dump, and a crash code number. The crash code number is generated based on software elements such as a filename, a function name, and a source code line number in effect when the crash occurred. Other information included within an individual crash report may involve the software product version number, the operating system, a service pack that may be in effect, the product configuration information including installed product patches, and the stock-keeping unit (SKU) code.

In addition to generating the individual crash report file, in some embodiments described herein, upon the occurrence of a product crash, an input window is generated for display to the end-user at the client system. This window facilitates input from the end-user regarding the product crash.

Some embodiments described herein include a pop-up or a pull-down menu of workflow options for selection by the end-user. These workflow options include end-user actions that may have been occurring at the time of the crash, and include: opening a file, closing a file, product upgrade, opening company database, entering login information, transferring business file to new product version, etc. The customer may select from one of the provided options, or enter new information into the provided customer input window.

Some embodiments described herein enable the end-user to optionally enter an email address. This can be used to personalize a response to the end-user. Such a response can include details involving a software patch solution for resolving a product crash.

The crash report page that is displayed to the developer at the server end assembles the individual descriptions of crash instances generated from the individual crash reports. In some embodiments described herein, the crash report page is displayed in a tabular format in which each row of the table corresponds to the description of an individual crash instance. In these embodiments, the columns of the table correspond to one or more of the following elements associated with the crash instance: the crash code number, the date of the crash, the SKU number, the operating system, the user mode in effect at the time of the crash, the number of users that were logged into the client system, the name of the function under execution, the source code line number under execution, the name of the file under execution, product operational mode, product hosting mode, data file drive type, source filename, frequency of occurrence of the crash code based on total received crash reports, and payload such as a memory dump, among others. Furthermore, the crash report may also include a customer email address as well as any other customer input regarding work-flow details. Display options may also be provided for filtering the crash report page by a Boolean combination of one or more column features and displaying the list of crash instances using the filtered set.

For example, it is possible to obtain a display of all crash occurrences for a specified SKU code of 'Premier'. Another example is to obtain a display of the crash report page corresponding to a display of crash instances that have been reported when more than two users are logged into a system with a Windows XP operating system running in a multiuser mode.

In some embodiments described herein, crash code numbers from received crash reports may be ranked based on the frequency of occurrences of the corresponding crashes, either within the lifetime of the software product or within a specified time period. This ranking may be used to guide development of product patches by the developer. Thus, for example, this ranking could be used by the developer to develop a product patch that resolves crashes corresponding to the top 50% of occurrences. Furthermore, this ranking may be displayed to the developer.

In some embodiments described herein, a threshold may be used to determine the number of displayed crashes in the ranked list. This threshold may be described as a lower bound, an upper bound, or a range of the frequency of occurrence. Thus, for example, it may be possible to obtain a display of the top 25% of all crash instances.

In some embodiments described herein, as product patches are developed to resolve product crashes, each product patch may have a product patch identifier. The product patch identifier may be associated with a set of crash code numbers corresponding to crash instances that are resolved when the product patch corresponding to the product patch identifier is applied to the software product. The association between the product patch identifier and the set of crash code numbers may then be stored in a database.

Furthermore, the ranked list of crash codes that are resolved by a particular product patch may also be displayed to the developer. Furthermore, the display may include the root cause, as determined by the developer, of each crash code as well.

In some embodiments described herein, when a new crash report is received from a customer at a client system, the system obtains the crash code number for the new crash report, and determines that a product patch has been previously generated. This determination is based on using the database to determine that a product patch identifier is associated with the crash code number. If the new crash report contains the customer email address, then an email is sent to the address regarding information about the product patch that corresponds to the product patch identifier.

In some embodiments described herein, when a new crash report is received from a customer at a client system, the system obtains the crash code number for the new crash report. Furthermore, when the crash report includes information regarding a previously installed product patch, the system uses the database to determine a crash code number associated with the product patch identifier for the product patch. In some cases, the database may associate a crash code number (e.g., CCN__1) for the new crash report with the product patch identifier (e.g., PPN__1) that corresponds to the installed product patch PP__1. Clearly, since the installed product patch PP__1 did not prevent the product crash corresponding to the crash code number, CCN__1, the system removes the stored association between the obtained crash code number CCN__1 and the product patch identifier PPN__1, and provides a notification to the developer regarding this. Specifically, the crash code number CCN__1 may be included in the next crash report page generated, and the system may stop emailing information about product patch PP__1 to customers when the system receives a crash report with crash code number CCN__1 from customers.

Computing Environment

FIG. 1 illustrates a network in accordance with some embodiments described herein. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120-122, network 150, server 160, database 170, and a developer system 162.

Clients 110-112 can include any node on a network with computational capability and with a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier). Furthermore, a client can include any type of electronic device, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client.

Similarly, a server 160 can generally include any node on a network including a mechanism for servicing requests from a client for computational and/or data storage resources. A server 160 can participate in an advanced computing cluster, or can act as a stand-alone server.

Users 120-122 can include: an individual; a group of individuals; an organization; a group of organizations; a computing system; a group of computing systems; or any other entity that can interact with computing environment 100.

Network 150 can include any type of wired or wireless communication channel capable of coupling together computing nodes. This includes, but is not limited to, a local area network, a wide area network, or a combination of networks. In some embodiments described herein, network 150 includes the Internet. In some embodiments described herein, network 150 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 160), to a client, or directly to a network.

Note that different embodiments may use different system configurations, and are not limited to the system configuration illustrated in computing environment 100. In general, any device that is capable of communicating via network 150 may include embodiments described herein.

Figure 2:
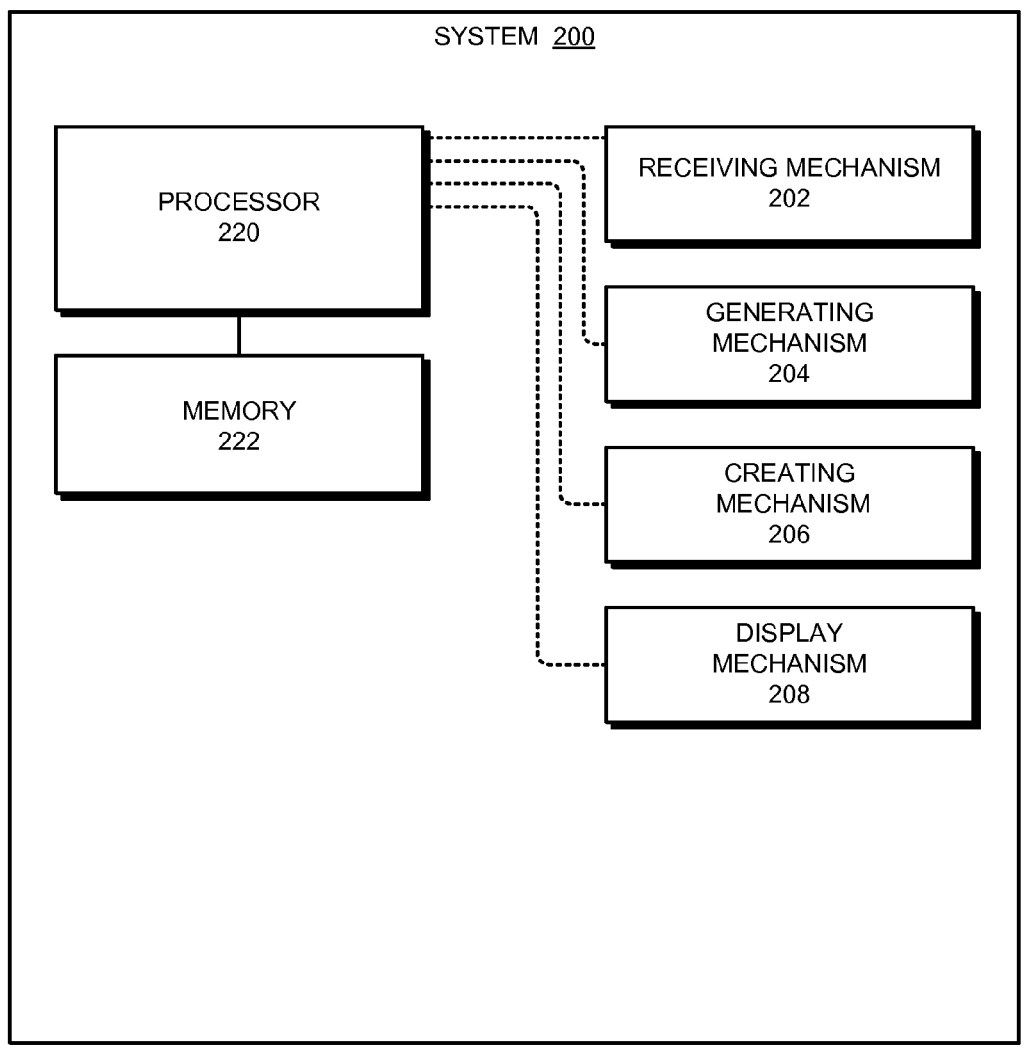
FIG. 2 illustrates a system in accordance with some embodiments described herein.

FIG. 2 illustrates a system 200 in accordance with some embodiments described herein. As illustrated in FIG. 2, system 200 can include processor 220, memory 222, receiving mechanism 202, generating mechanism 204, creating mechanism 206, and display mechanism 208. System 200 can further comprise server 160, database 170, clients 110-112, or any combination thereof.

Facilitating Determining a Solution for Software Product Crashes

Figure 3:
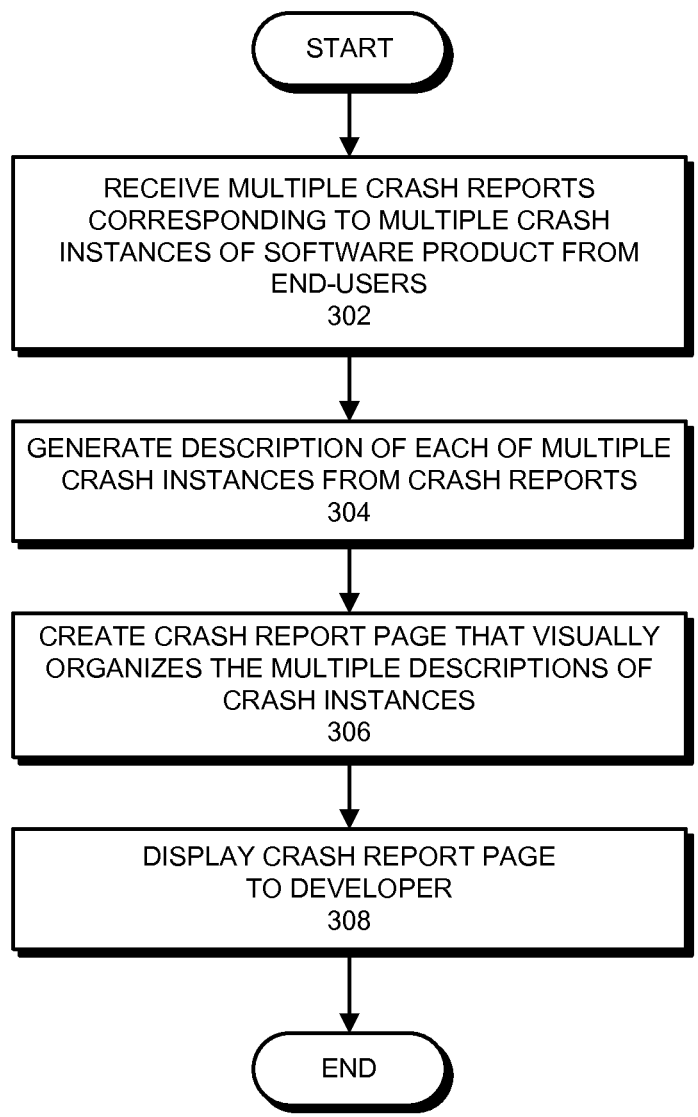
FIG. 3 presents a flowchart illustrating the process of organizing and displaying information regarding crash instances of a software product in accordance with some embodiments described herein.

FIG. 3 presents a flowchart illustrating the process of facilitating determining a solution for software product crashes.

During operation, a receiving mechanism 202 at a system 200 receives crash reports of a software product that was running at clients 110-112 (operation 302). These crash reports each correspond to crash instances of the software product at the same or different clients. Next, a generating mechanism 204 generates descriptions of each crash instance from the multiple crash reports (operation 304). These descriptions of the crash instances are used by a creating mechanism 206 to create a crash report page that visually organizes the descriptions of the crash instances (operation 306). The crash report page containing the visually organized descriptions of all the crash instances as reported is displayed to a developer 162 using a display mechanism 208 (operation 308).

Examples of Visually Organizing Crash Information

FIG. 4 presents an example of a crash report page 400 as generated by creating mechanism 206 of system 200 and displayed using display mechanism 208 to developer 162. Each crash is defined by the corresponding crash code number 410, and is described in a row of the table, In the presented example of the crash report page, two reported crashes corresponding to crash code numbers '3113120' and '3113088' are displayed in a tabular format, each crash corresponding to a row of the table. Other elements of the crash description are shown as column headings in the crash report page 400. These include the date of the reported crash 412, the SKU code 414 of the software product instance for which the crash is reported, customer input 416, email address when provided by the customer 418, the operating system 420, the data drive type 422 and whether an audit trail is enabled at the time of the crash 424. Note that in other embodiments, fewer, more or different column headings may be used in creating and displaying the crash report page.

FIG. 5 presents an example of a ranked crash code number display page 500 as generated by system 200, and displayed using display mechanism 208 to developer 162. Ranking 510 for crash code number 512 is based on the frequency of occurrences of the corresponding crash. Note that the shown example is a display of ranked crash code numbers that are resolved using a product patch 'Topaz-R3'.

In the presented example of the ranked crash code number display page 500, two reported crashes corresponding to crash code numbers '1524719' with a ranking of '1', and '1344532' with a ranking of '2', respectively, are displayed in a tabular format. Each crash code corresponds to a row of the table. Other elements shown as column headings in the ranked crash code display page 500 include the ranking, the total 514 and cumulative 516 percentage values of occurrence of the crash instance, as well as a determined root cause of the crash 518. Note that in other embodiments, fewer, more or different column headings may be used in creating and displaying the ranked crash code display for a product patch page.

Thus, for example, crash code number 13445 is resolved using the Topaz-R3 product patch. It corresponds to the second most commonly occurring product crash resolved by the Topaz-R3 patch, with a total occurrence of 10.1% of all total crashes.

Note that the presented examples are not intended to be exhaustive, and display selected column features only for illustrative purposes. Embodiments described herein can generate displays with more or fewer features than illustrated.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate determining a solution for a software product crash, comprising:
   receiving crash reports that correspond to crash instances of the software product;
   generating a description for each crash instance based on the crash reports;
   creating a crash report page that visually organizes each of the descriptions of the crash instances of the software product;
   displaying the crash report page to a user, thereby facilitating the user to determine a solution to at least some of the crash instances of the software product;
   receiving a product patch identifier;
   receiving a set of crash code numbers corresponding to crash instances that are resolved when a product patch corresponding to the product patch identifier is applied to the software product; and
   storing an association between the set of crash code numbers and the product patch identifier in a database.

2. The method of claim 1, wherein each crash report comprises at least one of: a memory dump, a log file, and a crash code number.

3. The method of claim 2, wherein each crash report includes information that specifies at least one of:

a product version number;
an operating system;
a service pack in effect;
a previously installed product patch;
product configuration information; and
a stock-keeping unit (SKU) code.

4. The method of claim 2, wherein the crash code number is based on at least one of: a filename, a function name, and a source code line number that was executing when the crash instance that corresponds to the crash report occurred.

5. The method of claim 2, wherein each crash report further comprises customer input regarding the corresponding crash instance.

6. The method of claim 5, wherein the customer input comprises at least one of:
work flow information; and
a customer email address.

7. The method of claim 5, wherein generating each description of a corresponding crash instance further involves assembling data corresponding to the customer input.

8. The method of claim 2, further comprising,
ranking each crash code number in the crash report page based on a frequency of reported occurrences of the crash instance corresponding to the crash code number; and
displaying a ranked list of crash code numbers.

9. The method of claim 1, wherein said generating the description for each crash instance involves assembling data corresponding to the crash instance, wherein the assembled data includes at least one of:
a crash code number;
a date of the crash;
an SKU code;
an operating system;
a user mode in effect;
a number of users logged in;
a name of a function under execution;
a source code line number under execution;
a filename under execution;
a mode of operation;
a data file drive type;
a source file name; and
a memory dump.

10. The method of claim 1, further comprising:
displaying a ranked list of crash code numbers associated with the product patch identifier.

11. The method of claim 1, further comprising sending an email regarding the product patch corresponding to the product patch identifier to available email addresses associated with each crash code number in the set of crash code numbers associated with the product patch identifier.

12. The method of claim 1, further comprising:
receiving a new crash report of the software product from a customer, wherein the new crash report includes the customer's email address;
obtaining a crash code number from the new crash report;
using the database to determine a product patch identifier that is associated with the crash code number; and
sending an email to the customer's email address that provides information of a product patch corresponding to the product patch identifier.

13. The method of claim 1, further comprising:
receiving a new crash report of the software product from a customer, wherein the new crash report identifies a product patch that was applied to the software product, wherein the product patch corresponds to a product patch identifier;
obtaining a new crash code number from the new crash report; and
in response to determining that the new crash code number is associated with the product patch identifier in the database, removing the association between the new crash code number and the product patch identifier in the database.

14. A non-transitory computer-readable storage medium storing instructions that, when executed by a computer, cause the computer to perform a method to facilitate determining a solution for a software product crash, the method comprising:
receiving crash reports that correspond to crash instances of the software product;
generating a description for each crash instance based on the crash reports;
creating a crash report page that visually organizes each of the descriptions of the crash instances of the software product;
displaying the crash report page to a user, thereby facilitating the user to determine a solution to at least some of the crash instances of the software product;
receiving a product patch identifier;
receiving a set of crash code numbers corresponding to crash instances that are resolved when a product patch corresponding to the product patch identifier is applied to the software product; and
storing an association between the set of crash code numbers and the product patch identifier in a database.

15. The non-transitory computer-readable storage medium of claim 14, wherein each crash report comprises at least one of: a memory dump, a log file, and a crash code number.

16. The non-transitory computer-readable storage medium of claim 14, wherein each crash report further comprises customer input regarding the corresponding crash instance, the customer input comprising at least one of:
work flow information; and
a customer email address.

17. An apparatus for facilitating determining a solution for a software product crash, the apparatus comprising:
a memory;
a processor;
a receiving mechanism configured to receive crash reports that correspond to crash instances of the software product;
a generating mechanism configured to generate a description for each crash instance based on the crash reports;
a creating mechanism configured to create a crash report page that visually organizes each of the descriptions of the crash instances of the software product;
a display mechanism configured to display the crash report page to a user, thereby facilitating the user to determine a solution to at least some of the crash instances of the software product; and
the receiving mechanism further configured to receive a product patch identifier and a set of crash code numbers corresponding to crash instances that are resolved when a product patch corresponding to the product patch identifier is applied to the software product, wherein the apparatus further comprises:
a storage mechanism configured to store an association between the set of crash code numbers and the product patch identifier in a database.

* * * * *